United States Patent
Paterson et al.

(10) Patent No.: US 10,387,234 B2
(45) Date of Patent: Aug. 20, 2019

(54) APPARATUS AND METHOD FOR CONTROLLING A POWER SUPPLY TO PROCESSING CIRCUITRY TO AVOID A POTENTIAL TEMPORARY INSUFFICIENCY IN SUPPLY OF POWER

(71) Applicant: ARM LIMITED, Cambridge (GB)

(72) Inventors: Richard Paterson, Sheffield (GB); Robert John Harrison, Sheffield (GB); Peter Uttley, Sheffield (GB)

(73) Assignee: ARM LIMITED, Cambridge (GB)

( * ) Notice: Subject to any disclaimer, the term of this patent is extended or adjusted under 35 U.S.C. 154(b) by 224 days.

(21) Appl. No.: 15/229,333

(22) Filed: Aug. 5, 2016

(65) Prior Publication Data

US 2018/0039323 A1    Feb. 8, 2018

(51) Int. Cl.
  *G06F 11/00* (2006.01)
  *G06F 11/07* (2006.01)
  *G06F 1/24* (2006.01)

(52) U.S. Cl.
  CPC ............ *G06F 11/0757* (2013.01); *G06F 1/24* (2013.01)

(58) Field of Classification Search
  CPC ............... G06F 11/0757; G06F 11/076; G06F 11/3058; G06F 11/3062; G06F 11/3072; G06F 1/324
  See application file for complete search history.

(56) References Cited

U.S. PATENT DOCUMENTS

| 6,438,462 | B1* | 8/2002 | Hanf | G06F 1/3203 340/693.4 |
| 6,718,271 | B1* | 4/2004 | Tobin | G01R 31/024 324/521 |
| 7,577,862 | B2* | 8/2009 | McClendon | G06F 1/206 713/300 |
| 8,176,349 | B2* | 5/2012 | Sawyers | G06F 1/3228 713/323 |
| 8,996,595 | B2* | 3/2015 | Gargash | G06F 1/3203 708/104 |
| 9,329,670 | B2* | 5/2016 | Allen-Ware | G06F 1/329 |
| 2005/0097228 | A1* | 5/2005 | Flautner | G06F 1/3203 710/1 |
| 2008/0028249 | A1* | 1/2008 | Agrawal | G06F 1/3203 713/501 |
| 2008/0307240 | A1* | 12/2008 | Dahan | G06F 1/06 713/320 |
| 2009/0091378 | A1* | 4/2009 | Haridass | G06F 1/28 327/554 |

(Continued)

*Primary Examiner* — Elmira Mehrmanesh
(74) *Attorney, Agent, or Firm* — Nixon & Vanderhye PC

(57) ABSTRACT

A data processing apparatus 2 includes processing circuitry 4 performing processing operations which move the processing circuitry 4 between logical states. Monitoring circuitry 18 monitors logical state variables of the processing circuitry and these are supplied to prediction circuitry 30 which detects predetermined patterns within the logical states which are indicative (previously correlated with) of a future potential temporary insufficiency in the supply power to the processing circuitry 4. When such a pattern is detected, then power control circuitry 8,10 serves to trigger a mitigation response to counteract the future potential temporary insufficiency in power supply, such as temporarily reducing the clock frequency and/or boosting the supply voltage.

17 Claims, 4 Drawing Sheets

(56) References Cited

U.S. PATENT DOCUMENTS

| | | | |
|---|---|---|---|
| 2009/0204831 A1* | 8/2009 | Cousson | G06F 1/3203 713/322 |
| 2010/0162256 A1* | 6/2010 | Branover | G06F 1/3203 718/104 |
| 2013/0169350 A1* | 7/2013 | Whatmough | G01R 31/30 327/530 |
| 2013/0318364 A1* | 11/2013 | Berry, Jr. | G06F 1/26 713/300 |
| 2014/0035661 A1* | 2/2014 | Myers | H02M 3/07 327/536 |
| 2015/0236549 A1* | 8/2015 | Budde | H02J 9/061 307/23 |
| 2016/0099564 A1* | 4/2016 | Luh | H02J 3/00 307/31 |
| 2016/0116924 A1* | 4/2016 | Meijer | G05F 1/462 327/143 |

* cited by examiner

APPARATUS AND METHOD FOR CONTROLLING A POWER SUPPLY TO PROCESSING CIRCUITRY TO AVOID A POTENTIAL TEMPORARY INSUFFICIENCY IN SUPPLY OF POWER

This disclosure relates to the field of data processing systems. More particularly, this disclosure relates to the control of the power supply to a data processing system.

It is known to provide data processing systems, such as system-on-chip integrated circuits, with power grids extending therethrough which serve to supply electrical power to the different portions of the data processing system. With the increase in circuit density and the reduction in component size within integrated circuits a problem arises in ensuring a sufficiently robust power supply to at least critical parts of the data processing system during all conditions of operation. If one or more parts of an integrated circuit require too much power for their operation at a given point in time, then this may result in a reduction (droop) in the voltage of the power supply to a degree which can trigger a fault in the operation of the data processing system, e.g. data corruption or a lock-up. These difficulties are made worse by variations which are typically present due to manufacturing tolerances between different integrated circuits or different parts of an integrated circuit. These variations may result in the power supply grid being relatively weak in some portions of the integrated circuit resulting in a tendency for voltage droops to occur in that portion and consequent incorrect operation. Other factors may also influence the reliability of the power supply, such as variations in the operating temperature of the integrated circuit with time or aging effects within the integrated circuit. These factors lead circuit designers to provide robust power supply grids specified to meet the power supply requirements even in a worst-case scenario of process, temperature and aging variations. This is wasteful of circuit area and other resources.

At least some embodiments of the present disclosure provide apparatus for processing data comprising:

processing circuitry to perform data processing operations to move said processing circuitry between logical states specified by said data processing operations;

power supply circuitry to supply power to said processing circuitry;

monitoring circuitry to monitor one or more logical state variables of said processing circuitry indicative of a logical state of said processing circuitry;

prediction circuitry to detect a predetermined pattern within said one or more logical state variables and indicative of a future potential temporary insufficiency in supply of power by said power supply circuitry to said processing circuitry; and power control circuitry responsive to detection of said predetermined pattern by said prediction circuitry to trigger a mitigation response to counteract said future potential temporary insufficiency.

At least some embodiments of the present disclosure provide apparatus for processing data comprising:

processing means for performing data processing operations to move said processing means between logical states specified by said data processing operations;

power supply means for supplying power to said processing means;

monitoring for monitoring one or more logical state variables of said processing means indicative of a logical state of said processing means;

prediction means for detecting a predetermined pattern within said one or more logical state variables and indicative of a future potential temporary insufficiency in supply of power by said power supply means to said processing means; and power control means, responsive to detection of said predetermined pattern by said prediction circuitry, for triggering a mitigation response to counteract said future potential temporary insufficiency.

At least some embodiments of the present disclosure provide a method of processing data comprising the steps of:

perform data processing operations with processing circuitry to move said processing circuitry between logical states specified by said data processing operations;

supplying power to said processing circuitry;

monitoring one or more logical state variables of said processing circuitry indicative of a logical state of said processing circuitry;

detecting a predetermined pattern within said one or more logical state variables and indicative of a future potential temporary insufficiency in supply of power to said processing circuitry; and in response to detection of said predetermined pattern, triggering a mitigation response to counteract said future potential temporary insufficiency.

Example embodiments will now be described, by way of example only, with reference to the accompanying drawings in which:

FIG. 1 schematically illustrates an apparatus for processing data including prediction circuitry to predict a future potential temporary insufficiency in supply of power within the apparatus for processing data in order to trigger a mitigation response to counteract that future potential temporary insufficiency;

FIG. 2 schematically illustrates how a clock signal may be controlled so as to reduce its effective frequency and so serve as a mitigation response to counteract a future potential temporary insufficiency in power supply;

Figure 1:
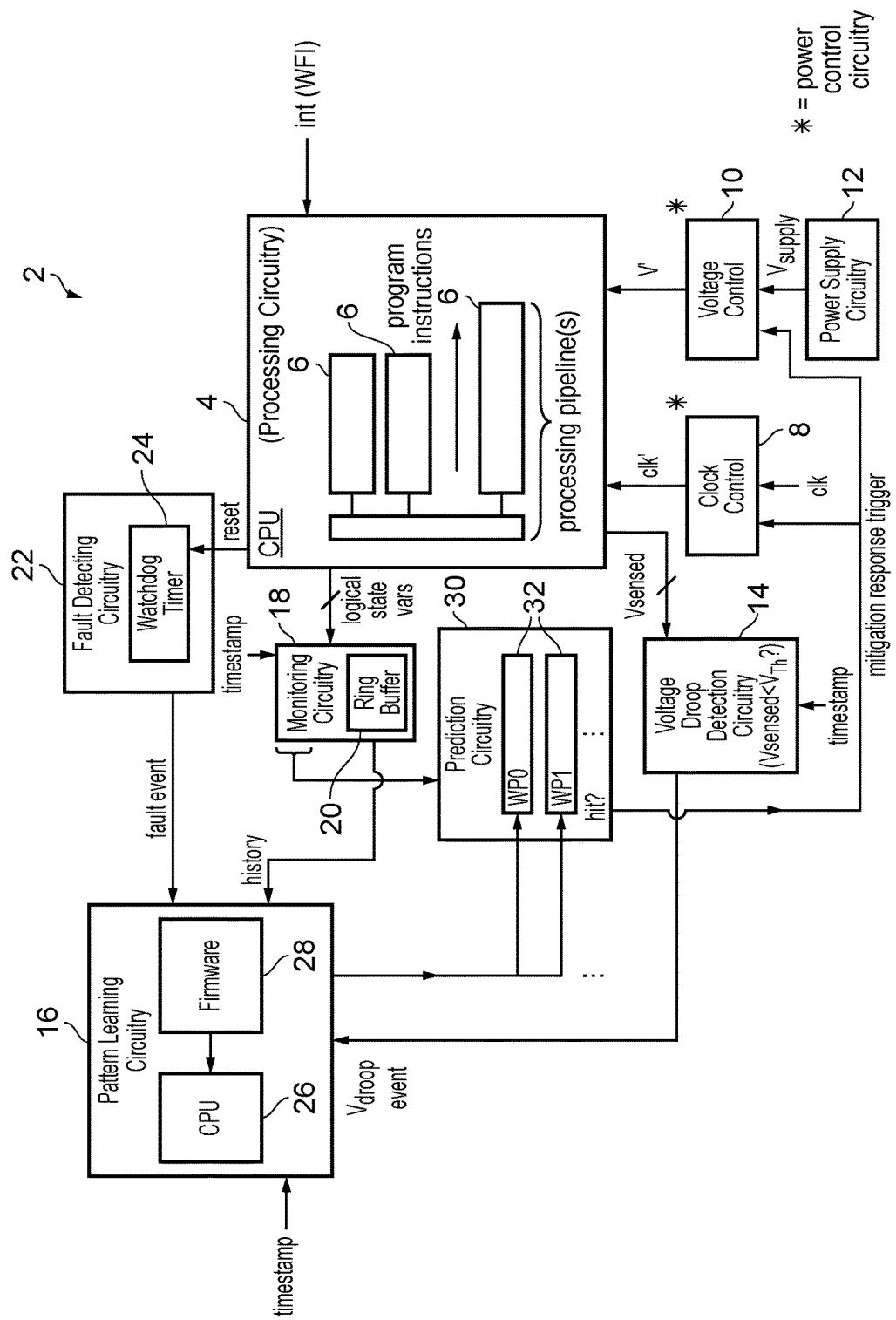

FIG. 1 schematically illustrates an apparatus for processing data 2 which may be in the form of a system-on-chip an integrated circuit having a power grid extending therethrough to supply electrical power to the various circuit elements within the apparatus for processing data 2. It will be appreciated that many circuit elements have been omitted from FIG. 1 to improve clarity. The apparatus for processing data 2 includes processing circuitry to perform data processing operations to move the processing circuitry between logical states specified by the data processing operations. As an example, the processing circuitry may be a processor core 4 executing a stream of program instructions which serves to move the processor core 4 between a sequence of logical states controlled by the processing instructions and the data values manipulated by the processing instructions. In other example embodiments the processing circuitry could take other forms, such as a graphics processing unit (GPU), a digital signal processor (DSP), digital processing circuitry not controlled by program instructions, or a wide variety of further different types of data processing circuitry for performing data processing operations. The apparatus could also include multiple different processing circuitry of the same or different forms and having their own prediction circuitry and anti-voltage droop mechanisms or sharing such mechanisms.

The processor core 4 includes pipeline circuitry in the form of a plurality of processing pipelines 6 for executing program instructions to perform processing operations in parallel. This type of arrangement will be familiar to those in this technical field and helps provide a high throughput of program instruction execution with a relatively high degree of instruction execution parallelism. The processor core 4 is subject to an interrupt signal or "int" which may be used to provide wait-for-interrupt behavior by the processor core 4. Such wait-for-interrupt behavior is initiated by the execution of a wait-for-interrupt instruction (WFI), which serves to suspend further processing operations by the processor core 4 until an interrupt signal is received. While processing operations are suspended, the power consumption of the processor core 4 is reduced. However, when the interrupt signal is received, the execution of program instructions rapidly resumes and this can result in a rapid increase in power consumption by the processor core 4, which in turn can produce a sufficient voltage droop within the power signal supply to at least some portions of the processor core 4 to trigger faults in the operation of the processor core 4. Resuming processing operations after execution of a wait-for-interrupt instruction is a point of vulnerability within the provision of a sufficient power supply to the processor core 4.

The processor core 4 is provided with a clock signal clk' by clock control circuitry 8. The clock control circuitry 8 derives the clock signal clk' supplied to the processor core 4 from a base clock signal clk supplied to the clock control circuitry 8 (e.g. from a PLL circuit). The clock control circuitry 8 can modify the clock signal clk it receives to generate the clock signal clk' which is supplied to the processor core 4. The clock signal clk' may be modified, for example, by suppressing clock pulses within the clock signal clk, extending the time between predetermined edges within the clock signal clk (e.g. extending the time between rising edges or between falling edges so as to reduce the switching activity of the clock signal). Another form of modification of the clock signal would be to adjust its basic frequency, such as by dividing down the clock signal frequency.

The processor core 4 is supplied with a power supply signal having a voltage V' by voltage control circuitry 10. The voltage control circuitry 10 receives a power supply signal $V_{supply}$ from power supply circuitry 12 and can serve to adjust the voltage level of this power supply signal $V_{supply}$ to either reduce the voltage level or boost the voltage level in the power supply signal V' which his applied to the processor core 4 via its power grid.

Voltage droop detection circuitry 14 is coupled to various sensitive (prone to voltage droop and/or critical to proper operation) points within the processor core 4 and reads sensed voltage levels V sensed from those points. The sensed voltage levels are compared with a threshold level $V_{Th}$. If a sensed voltage level $V_{sensed}$ falls below the threshold voltage level $V_{Th}$, then a voltage droop event is signaled to pattern learning circuitry 16. The voltage droop detection circuitry 14 receives time stamp data from a timestamp source (e.g. an incrementing timestamp counter (not illustrated)) and accordingly the voltage droop event is accompanied by a timestamp value as supplied to the pattern learning circuitry 16 thereby facilitating correlation of that voltage droop event with other events notified to the pattern learning circuitry 16.

Monitoring circuitry 18 is coupled to the processor core 4 (an example of one particular form of processing circuitry which may use the present techniques) and serves to monitor one or more logical state variables of the processor core 4 which are indicative of a logical state of the processor core 4 at a particular point in time. These logical state variables could take a variety of different forms. The logical state variables monitored are selected to be logical (digital signals intended to have a binary value as contrasted to analog signals intended to have analog values) which have a good probability of being correlated with voltage droop events. The logical state variables may include pipeline signals from the plurality of processing pipelines 6 indicative of a logical state of the processing pipeline circuitry (e.g. how many of the processing pipelines 6 are active at a given point of time). A further example of the logical state variables monitored by the monitoring circuitry 8 include program instruction signals indicative of which program instructions (e.g. identifying the program opcodes and/or operands) are currently under execution by the processing pipeline 6 (e.g. some particular program instructions may be particularly computationally intensive involving a greater than normal amount of gate switching and so are more likely to result in a temporary voltage droop). It will be appreciated that the logical state variables which are monitored by the monitoring circuitry 18 are not limited to these examples and any logical state variable within the processor core 4 may be selected for monitoring if it is considered that it may correlate with voltage droop events in a useful manner.

The monitoring circuitry 18 serves to sample a sequence of sampled logical states of the processor core 4, with each sampled logical state comprising a plurality of sampled logical state variables and an associated timestamp supplied as an input to the monitoring circuitry 18 at the sampling time. The monitoring circuitry 18 records a sequence of snapshots of selected logical state variables within the processor core 4 and associates these with a timestamp value. The sampled logical states (each comprising a plurality of sampled logical state values and a timestamp value) are stored within a ring buffer 20 within the monitoring circuitry 18.

Fault detecting circuitry 22 is coupled to the processor core 4 and serves to detect faults in operation of the processor core 4. Such faults may be detected in a variety of different ways, one example of which is the use of a watchdog timer circuit 24 within the fault detecting circuitry 22. The watchdog timer circuitry 24 is set to count a predetermined watchdog timer period. The processor core 4 is programmed such that if it is operating normally then it will reset the watchdog time period to its initial value before it reaches the count corresponding to the end of the watchdog timer period. However, if the processor core 4 ceases to operate normally, such as a result of a fault in its operation, then the resetting of the watchdog timer circuitry will not take place in due time and the watchdog timer will count down to the end of the period. This results in a fault event being signaled to the pattern learning circuitry 16. The fault within the processor core 4 which results in the watchdog timer circuitry 24 not being reset in a timely manner could be the result of a variety of different causes. Such causes need not necessarily be that our supply voltage to at least a portion of the processor core 4 has suffered a fault-inducing voltage droop. Accordingly, the pattern learning circuitry 16 serves to differentiate between fault events which are signaled to it that are consequent to a voltage droop event and those which have another cause (e.g. a cosmic ray strike).

When the pattern learning circuitry 16 receives a fault event signal from the fault detecting circuitry 22 it serves to read the results of voltage droop events notified to it by the voltage droop detection circuitry 14 to determine whether the timestamp associated with any of the voltage droop events corresponds to the time at which the fault event was notified to the pattern learning circuitry 16. If a voltage droop event matches (within a predetermined time tolerance) in time with a signaled fault event, then there is a high probability that the fault event was the result of a voltage droop event. In this case, the pattern learning circuitry 16 reads from the ring buffer 20 within the monitoring circuitry 18 one or more sampled logical states each comprising a plurality of sampled logical state variables and an associated timestamp in order to identify patterns within the sampled logical state variables which correlate with the detection of the fault event which was the result of the voltage droop event.

The pattern learning circuitry 16 may take the form of a further processor core 26 operating under control of firmware program instructions 28 to execute an algorithm which identifies a correlation between the sampled logical state variables and the occurrence of voltage droop events which result in fault events. Such a correlation may, at a simple level, merely correspond to identifying the particular pattern of logical state variables which was sampled immediately preceding the occurrence of the voltage droop event. However, it will be appreciated that a more sophisticated analysis of correlation would also be possible such as, for example, including identifying a predetermined pattern within the sampled logical state variables corresponding to a predetermined temporal sequence of logical state variables preceding the detected voltage droop event. Such a more sophisticated correlation recognises that the occurrence of a voltage droop event may be the result of a sequence of preceding events within the processor core 4 rather than an individual event, such as the execution of an individual instruction. As an example, a voltage droop event may occur if a long sequence of highly computationally intensive program instructions are executed back-to-back in a way that involves a significantly higher than average degree of gate switching within the processor core 4 and consequently results in a voltage droop. As the pattern learning circuitry 16 takes the form of a programmable further processor core 26, sophisticated pattern matching algorithms may be executed in order to identify predetermined patterns which correlate with voltage droop events.

When a predetermined pattern within the logical state variables has been identified by the pattern learning circuitry 16 and found to correlate with a voltage droop event, this pattern is supplied to prediction circuitry 30 to serve as watchpoint data within a plurality of watchpoint circuits 32. Each of these watchpoint circuits 32 serves to monitor each new set of logical state variables stored into the ring buffer 20 to determine if these match the first set of logical state variables being watched for by that watchpoint circuit 32. It will be appreciated that masking may be applied to the comparison used by the watchpoint circuitry 32 such that a particular predetermined pattern may not include specific values for all of the sampled logical state variables for a particular sampled logical state. When the first sample being watched for by a watchpoint circuit 32 is identified (matched), the watchpoint circuit 32 continues to examine further sets of sampled logical variable as indicated by its predetermined pattern until the whole pattern or has not been recognised. It is possible that a pattern to be recognised may comprise one set of logical state variables (values), but in more sophisticated scenarios, as discussed above, a voltage droop event may be characterised by a sequence of events occurring within the processor core 4 rather than any particular individual logical state at a particular point in time.

When the prediction circuitry 30 detects a predetermined pattern using the watchpoint circuits 32, this is indicative of a future potential temporary insufficiency in the supply of power by the power supply circuitry 12 to the processor core 4. It will be appreciated that the insufficiency in the power supply may not be certain to occur as, for example, the particular operating temperature of the processing core 4 at the given time may not be such that the fault-inducing voltage droop will actually occur. Nevertheless, detection of the predetermined pattern is indicative of a potential insufficiency in the supply of power. The insufficiency in the supply of power is a temporary insufficiency in that it corresponds to a voltage droop (reduction) which is expected to recover rather than the power supply voltage permanently falling below a required level.

When the prediction circuitry 30 detects a predetermined pattern indicative of a future potential temporary insufficiency in the supply of power, it triggers a mitigation response to counteract that future potential temporary insufficiency within power control circuitry. The power control circuitry can take a variety of different forms, but in this example embodiment takes the form of the clock control circuitry 8 and the voltage control circuitry 10. The mitigation response to counteract the identified future potential temporary insufficiency in power supply takes the form of one or both of reducing an effective frequency of a clock signal clk' supplied to the processor core 4 by the clock control circuitry 8 and/or increasing a voltage of the power supply signal V' supplied to the processor core 4 by the voltage control circuitry 10. Reducing the effective clock frequency of the clock signal clk' which regulates the processing of processing operations by the processor core 4 has the result of reducing the power consumption of the processor core 4 by reducing the rate of gate switching. Boosting the supply voltage temporarily directly serves to counteract the voltage droop. The manner in which the effective frequency of the clock signal may be reduced can take a variety of different forms, as previously discussed, and will be discussed further below.

The mitigation responses which are triggered are themselves temporary responses that are removed after a period of time to return the system to a nominal state. It is undesirable to permanently reduce the clock signal frequency as this would reduce the instruction execution rate of the processor core 4. Similarly, it is undesirable to permanently boost the supply voltage V' as this would increase the power consumption of the processor core 4. Thus, the mitigation responses are temporarily applied consequent to the identification of the predetermined patterns which are indicative of future potential temporary insufficiencies in the supply of power. The mitigation responses are preemptively applied such that the voltage droop which would result in a fault in operation does not occur or is reduced in severity such that a fault does not occur. The duration for which the mitigation response is applied may itself be programmable such that it does not extend for too long in a manner which would be wasteful of either processor performance or energy consumed.

It is possible that in some example implementations the predetermined patterns may be established in advance of field use once the design of the an integrated circuit has been finalised and sample implementations are available for testing. These sample implementations may be tested with a suite of processing activity to identify predetermined patterns indicative of voltage droop events which may be preemptively avoided. The firmware 28 associated with the pattern learning circuitry 16 may then be appropriately programmed so as to load the watch point circuits 32 with the predetermined patterns when the data processing apparatus 2 boots or is initialised.

It is also possible that there may be instance-to-instance variation due, for example, to manufacturing variation resulting in variation in the vulnerability of particular integrated circuits to voltage droop events. In this case, the pattern learning circuitry may, during field operation of an integrated circuit, learn predetermined patterns of logical state values which are indicative of voltage droop events for that particular instance of the integrated circuit and appropriately program the watchpoint circuits 32 to identify and trigger mitigation responses for those particular newly learned predetermined patterns. Furthermore, the individual vulnerability of an integrated circuit to voltage droop events may vary with time, such as due to circuit aging, and the pattern learning circuitry 16 may learn and program predetermined patterns corresponding to voltage droop vulnerabilities within an aged integrated circuit as that integrated circuit progresses through its field life.

Another potential use of the disclosed techniques is to facilitate "binning" whereby individual manufactured instances of integrated circuits may be identified as either particularly prone to voltage droop events or particularly resistant to voltage droop events. Instances of an integrated circuit which are particularly resistant to voltage droop events may, for example, be operated with lower nominal supply voltages to reduce power consumption or at higher clock frequencies so as to yield superior performance. Such integrated circuits may command a premium price. Conversely, particular instances of an integrated circuit which are prone to voltage droop events may nevertheless be used if they are operated at a higher than normal supply voltage level or at a slower than normal clock frequency and thus have a commercial value even if this may be lower than the instances which are not prone to voltage droop events.

Figure 2:
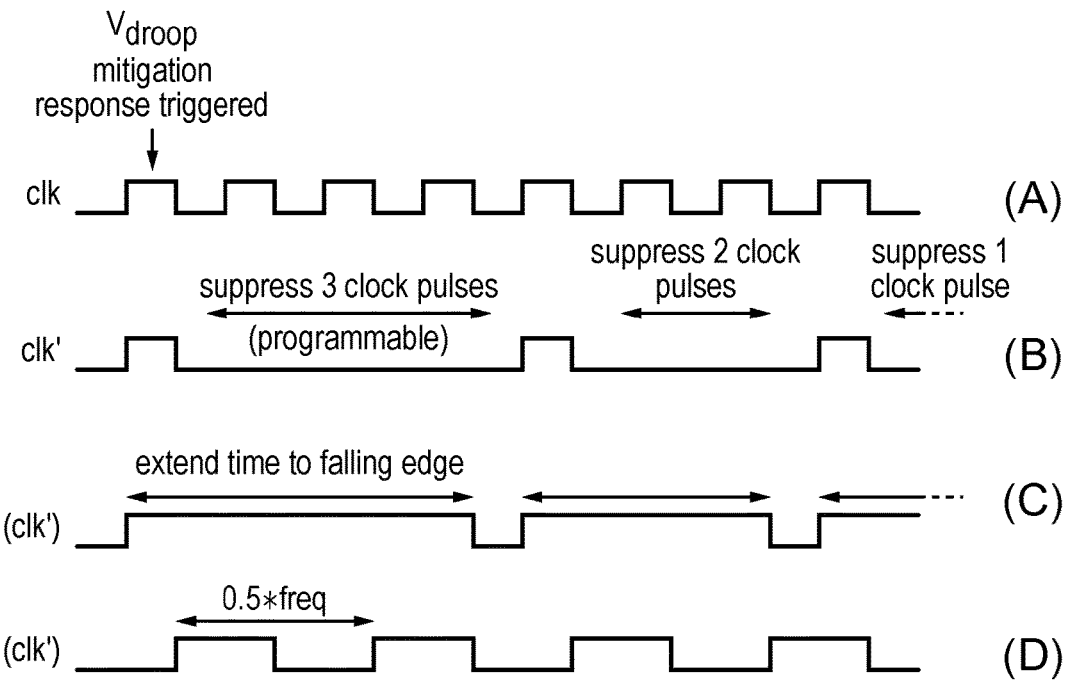

FIG. 2 schematically illustrates a plurality of different ways in which the clock control circuitry 8 may reduce the clock frequency of the clock signal clk' which is supplied to the processor core 4. The clock control circuitry 8 receives a basic clock signal clk (A). When a voltage droop event is identified in advance, then a mitigation response is triggered and the clock control circuitry 8 may be used to suppress a number of clock pulses (suppress a programmable number of such clock pulses) in a manner which effectively reduces the clock frequency. As an example, in the illustrated reduced frequency clock signal clk' (B) illustrated in FIG. 2, first three clock pulses are suppressed followed by the suppression of two clock pulses and then the suppression of one clock pulse before the clock signal is returned to its nominal form. Thus, the effective clock frequency of the processor core 4 is reduced in advance of the behavior which previously resulted in a voltage droop event that induced a fault in operation such that the voltage droop event and fault may be avoided. The clock frequency is then gradually returned to its nominal full-speed frequency.

As an alternative to clock pulse suppression, the clock control circuitry 8 may serve to instead extend the time between predetermined edges within the clock signal, such as extending the time to the falling edge. Accordingly, in the example (C) illustrated in FIG. 2, the falling edge of the first clock pulse is extended in time such that it effectively suppresses three previous pulses. The subsequent falling edge is the extended in time to effectively suppress two clock pulses and finally the falling edge is extended in time to suppress one clock pulse. Modifying the clock signal in this way reduces the gate switching frequency of at least some of the gates within the processor core 4 in a manner which can reduce power consumption.

The final example (D) illustrated in FIG. 2 is that the clock control circuitry 8 reduces the clock frequency by clock frequency division to generate a clock signal clk' which has half the frequency of the original signal.

Figure 3:
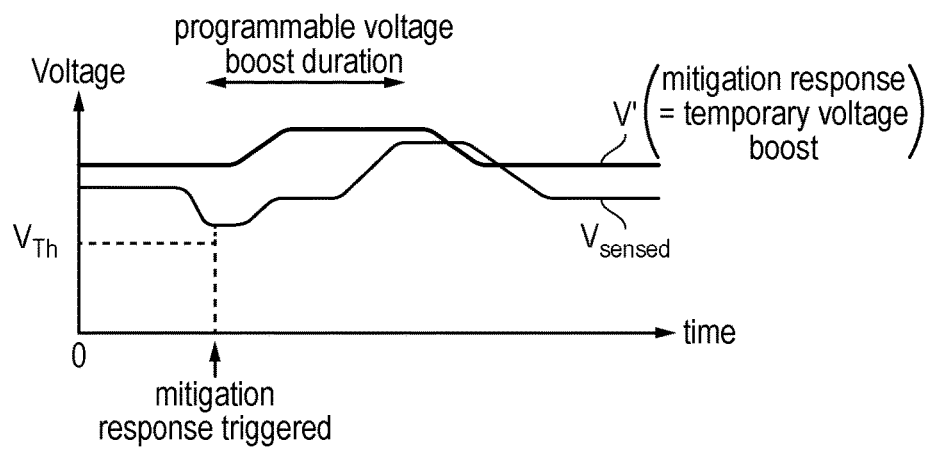
FIG. 3 is a graph illustrating how the voltage of a power supply signal may be altered with time to counteract a future potential temporary insufficiency in power supply.

FIG. 3 illustrates a mitigation response which may be triggered by the voltage control circuitry 10 in response to a detected predetermined pattern of logical state values sampled by the monitoring circuitry 18. FIG. 3 illustrates how voltage varies with time for both the sensed voltage (one sensed voltage signal among many is illustrated) $V_{sensed}$ and the applied supply voltage signal level V' supplied to the processor core 4 by the voltage control circuitry 10. As illustrated, as time progresses the logical state within the processor core 4 results in a reduction in the sensed voltage $V_{sensed}$. This is identified by the prediction circuitry 30 using the predetermined pattern within one of the watchpoint circuits 32 within which it has been programmed and accordingly a mitigation response which boosts the supply voltage level is triggered before the sensed voltage level has drooped as low as the voltage threshold $V_{Th}$, which would likely give rise to a fault in operation. Thus, as shown, the supply voltage V' applied to the processor core 4 by the voltage control circuitry 10 is temporarily boosted to a higher level for a programmable boost duration and this results in a recovery of the sensed voltage $V_{sensed}$. When the particular combination of logical state which was vulnerable to voltage droop has passed, then the sensed voltage $V_{sensed}$ will rise above the nominally required level. When the temporary voltage boost is removed, the sensed voltage level $V_{sensed}$ returns to its nominal level.

Figure 4:
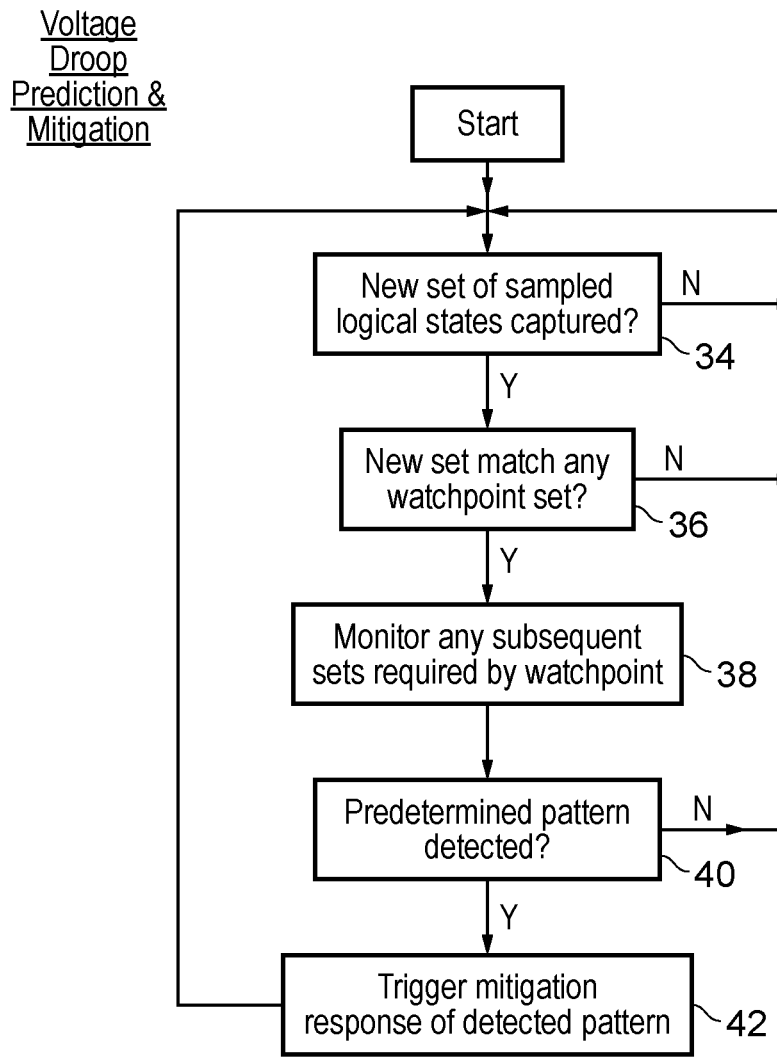
FIG. 4 is a flow diagram schematically illustrating voltage droop prediction and mitigation.

FIG. 4 is a flow diagram schematically illustrating voltage droop prediction and mitigation as performed within the circuitry of FIG. 1. At step 34 processing waits until a new set of logical states are to be captured. When a new set of states are captured, then step 36 compares these with all of the first set of states characterising any of the watchpoints being monitored by the watchpoint circuits 32. If none of these match, then processing returns to step 34. If any of the watchpoint circuits 32 detects a match, then processing proceeds to step 38 at which any subsequent sets of sampled states required by that particular watchpoint circuit 32 in order to yield a match to its predetermined pattern are monitored. When all of these subsequent sets of states have been monitored, then step 40 determines whether or not a predetermined pattern has been detected. If a predetermined pattern has not been detected, then processing again returns to step 32. If a predetermined pattern has been detected, then step 42 serves to trigger a mitigation response associated with that particular detected pattern. Each detected pattern may have its own mitigation response which is programmable, such as a programmable duration of mitigation response, a programmable level of clock frequency of reduction, a programmable amount of voltage boost, a programmable combination of one or both of the clock frequency reduction or voltage boost, or other programmable parameters of the mitigation response.

Figure 5:
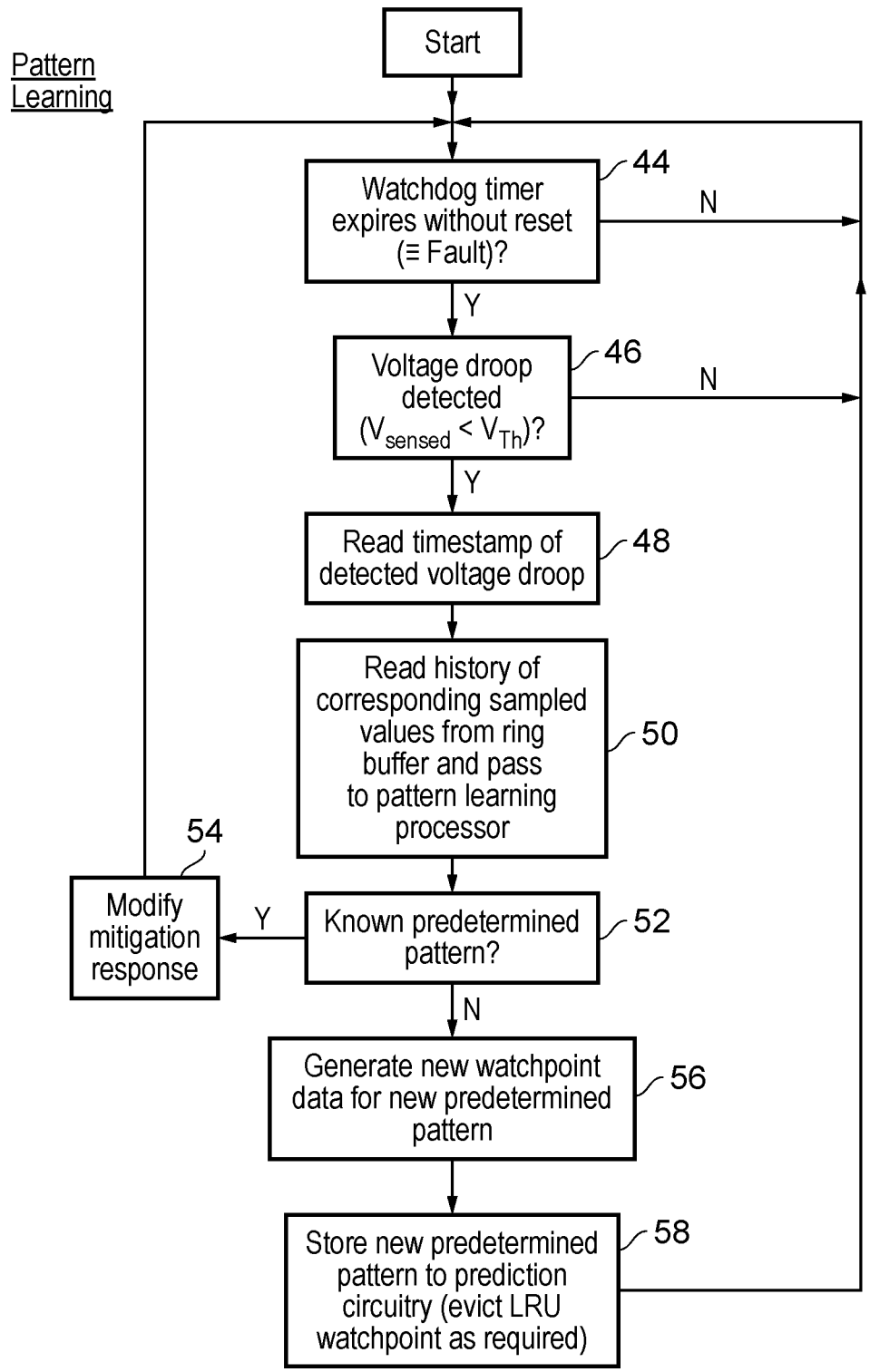
FIG. 5 is a flow diagram schematically illustrating pattern learning.

FIG. 5 is a flow diagram schematically illustrating pattern learning. At step 44 processing waits until a watch dog timer is detected as expiring without a reset as this corresponds to a fault event in operation of the processor core 4. Additional or alternative forms of fault detection are also possible, such as ECC circuitry for detecting errors in stored values, or other forms of fault/error detection circuitry. When such a fault event is detected, processing proceeds to step 46 at which the voltage droop detection circuitry 14 is interrogated to determine whether there is a corresponding voltage droop event detected with a timestamp corresponding to the time at which the fault event was detected. If there is no corresponding (within a threshold range of times) voltage droop event, then the fault detected at step 44 is not identified as a fault resulting from a voltage droop and processing again returns to step 44.

If the determination at step 46 is that there was a voltage droop event corresponding in time with the fault event, then step 48 serves to read the timestamp of the detected voltage droop event and use this at step 50 to read the history of sampled logical state variables from within the ring buffer 20 corresponding to the period of time preceding the detected voltage droop event. These history valued are read by the pattern learning circuitry 18 using its further processor core 26 under control of a firmware program 28.

At step 52 the pattern learning circuitry 16 determines whether or not the history values read at step 50 correspond to a known predetermined pattern which has already been identified. If this is the case, then the mitigation response currently in place for that known predetermined pattern is not sufficient to stop the voltage droop event occurring and triggering a fault and accordingly processing proceeds to step 54 at which the mitigation response for that known predetermined pattern may be modified, such as by further reducing the clock frequency, extending the duration of the mitigation response, extending a degree of voltage boost applied, etc.

If the determination at step 52 is that the pattern identified is not a known pattern, then step 56 serves to generate new watchpoint data for the new predetermined pattern and this is stored into one of the watchpoint circuits 32 at step 58. It may be that all of the instances of the watchpoint circuits 32 are already storing watchpoint data in which case a victim set of watchpoint data is identified for eviction and replacement by the newly identified predetermined pattern. Such eviction may, for example, use a least recently used (LRU) algorithm to select the victim to be evicted.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

We claim:

1. Apparatus for processing data comprising:
   processing circuitry to perform data processing operations to move said processing circuitry between logical states specified by said data processing operations;
   power supply circuitry to supply power to said processing circuitry;
   monitoring circuitry to monitor one or more logical state variables of said processing circuitry indicative of a logical state of said processing circuitry;
   fault detection circuitry to detect faults in operation of said processing circuitry;
   voltage droop detecting circuitry to detect a droop having at least one predetermined characteristic in a voltage of a power supply signal supplied to said processing circuitry by said power supply circuitry;
   pattern learning circuitry to identify a pattern in said one or more logical state variables that is correlated with detection of a fault by said fault detection circuitry and with detection of said droop;
   prediction circuitry to consider the pattern identified by the pattern learning circuitry as a predetermined pattern, and to treat a subsequently detected occurrence of the predetermined pattern within said one or more logical state variables as being indicative of a future potential temporary insufficiency in supply of power by said power supply circuitry to said processing circuitry; and
   power control circuitry responsive to detection of said predetermined pattern by said prediction circuitry to trigger a mitigation response to counteract said future potential temporary insufficiency.

2. Apparatus as claimed in claim 1, wherein said mitigation response comprises one or more of:
   reducing a frequency of a clock signal supplied to said processing circuitry to regulate a rate of execution of said processing operations; and
   increasing a voltage of a power supply signal supplied to said processing circuitry by said power supply circuitry.

3. Apparatus as claimed in claim 2, wherein said reducing said frequency comprises suppressing one or more clock cycles within said clock signal.

4. Apparatus as claimed in claim 3, wherein said reducing said frequency comprises suppressing a programmable number of clock cycles.

5. Apparatus as claimed in claim 4, wherein subsequent to suppressing said programmable number of clock cycles, said frequency is ramped back up to a nominal value by suppressing fewer subsequent clock cycles.

6. Apparatus as claimed in claim 2, said reducing said frequency comprises extending a time between a transition in a predetermined direction within said clock signal.

7. Apparatus as claimed in claim 1, wherein said processing circuitry comprises processing pipeline circuitry to perform a plurality of said processing operations in parallel and wherein said one or more logical state variables comprise one or more pipeline signals indicative of a logical state of said processing pipeline circuitry.

8. Apparatus as claimed in claim 7, wherein said processing pipeline circuitry executes program instructions and said one or more logical state variables include program instruction signals indicative of program instructions currently under execution by said processing pipeline circuitry.

9. Apparatus as claimed in claim 8, wherein said predetermined pattern includes one or more logical signals indicative of a wait-for-interrupt program instruction that pauses program execution until an interrupt signal is detected.

10. Apparatus as claimed in claim 1, wherein said fault detection circuitry comprises a watchdog timer circuit and a fault in operation of said processing circuitry is detected when said processing circuitry does not reset said watchdog timer circuit within a predetermined timer interval from a preceding reset of said watchdog timer circuit.

11. Apparatus as claimed in claim 1, wherein said predetermined pattern comprises a predetermined temporal sequence of logical state variables comprising a plurality of sampled logical states.

12. Apparatus as claimed in claim 11, wherein each of said plurality of sampled logical states comprises a plurality of logical sampled state variables.

13. Apparatus as claimed in claim 12, wherein monitoring circuitry comprises a ring buffer to store sample history data comprising a most recent sequence of sampled logical states.

14. Apparatus as claimed in claim 13, wherein said prediction circuitry detects said predetermined pattern within said most recent sequence of sampled logical states stored within said ring buffer.

15. Apparatus as claimed in claim 1, wherein said pattern learning circuitry comprises a programmable processor to execute program instructions to identify the pattern in said one or more logical state variables that is correlated with detection of a fault by said fault detection circuitry.

16. Apparatus for processing data comprising:
means for performing data processing operations to move said means for processing between logical states specified by said data processing operations;
means for supplying power to said means for processing;
means for monitoring one or more logical state variables of said means for processing indicative of a logical state of said means for processing;
means for detecting faults in operation of said means for processing;
means for detecting a droop having at least one predetermined characteristic in a voltage of a power supply signal supplied to said means for performing data processing by said means for supplying power;
means for identifying a pattern in said one or more logical state variables that is correlated with detection of a fault by said means for detecting and with detection of said droop;
means for considering the pattern identified by the means for identifying a pattern as a predetermined pattern and for treating a subsequently detected occurrence of the predetermined pattern within said one or more logical state variables as being indicative of a future potential temporary insufficiency in supply of power by said means for supplying power to said means for processing; and
means, responsive to detection of said predetermined pattern by said means for considering the pattern, for triggering a mitigation response to counteract said future potential temporary insufficiency.

17. A method of processing data comprising the steps of:
perform data processing operations with processing circuitry to move said processing circuitry between logical states specified by said data processing operations;
supplying power to said processing circuitry;
monitoring one or more logical state variables of said processing circuitry indicative of a logical state of said processing circuitry;
detecting a fault in operation of said processing circuitry;
detecting a droop having at least one predetermined characteristic in a voltage of a power supply signal supplied to said processing circuitry;
employing pattern learning circuitry to identify a pattern in said one or more logical state variables that is correlated with detection of the fault and with detection of said droop;
considering the pattern identified by the pattern learning circuitry as a predetermined pattern, and treating a subsequently detected occurrence of the predetermined pattern within said one or more logical state variables as being indicative of a future potential temporary insufficiency in supply of power to said processing circuitry; and
in response to detection of said predetermined pattern, triggering a mitigation response to counteract said future potential temporary insufficiency.

* * * * *